US007402215B2

(12) United States Patent
Ohashi et al.

(10) Patent No.: US 7,402,215 B2
(45) Date of Patent: Jul. 22, 2008

(54) DEFORMED WIRE FOR REINFORCING MARINE OPTICAL FIBER CABLE

(75) Inventors: Shoichi Ohashi, Kamaishi (JP); Hitoshi Demachi, Tokyo (JP); Masatsugu Murao, Higashiosaka (JP); Michiyasu Honda, Higashiosaka (JP)

(73) Assignees: Nippon Steel Corporation, Tokyo (JP); Namitei Co., Ltd., Osaka (JP); OCC Corporation, Kanagawa (JP)

( * ) Notice: Subject to any disclaimer, the term of this patent is extended or adjusted under 35 U.S.C. 154(b) by 357 days.

(21) Appl. No.: 10/511,589

(22) PCT Filed: Jan. 14, 2003

(86) PCT No.: PCT/JP03/00216

§ 371 (c)(1), (2), (4) Date: Jan. 26, 2006

(87) PCT Pub. No.: WO03/087419

PCT Pub. Date: Oct. 23, 2003

(65) Prior Publication Data

US 2006/0154101 A1 Jul. 13, 2006

(30) Foreign Application Priority Data

Apr. 12, 2002 (JP) ............................ 2002-110807

(51) Int. Cl.

*C22C 38/22* (2006.01)
*C22C 38/24* (2006.01)
*C22C 38/26* (2006.01)
*C22C 38/28* (2006.01)
*C22C 38/32* (2006.01)

(52) U.S. Cl. ....................... 148/320; 148/334; 148/909; 148/330; 385/108

(58) Field of Classification Search ................. 148/320, 148/330, 334, 909, 519, 521, 529, 534, 593, 148/595, 598, 599; 428/607; 385/107, 108
See application file for complete search history.

(56) References Cited

U.S. PATENT DOCUMENTS 4,889,567 A * 12/1989 Fujiwara et al. ............. 148/598
6,527,883 B1 * 3/2003 Kawabe et al. .............. 148/580

FOREIGN PATENT DOCUMENTS

| | | |
|---|---|---|
| JP | 62202051 A | 9/1987 |
| JP | 7-65142 | 7/1995 |
| JP | 2742440 | 1/1998 |
| JP | 2001-271138 | 10/2001 |

OTHER PUBLICATIONS

English abstract of Japanese patent 2004277759, Kuroda, Takeshi et al., Oct. 7, 2004.*

English abstract of Japanese patent 402285026, Takahashi, Toshihiko et al., Nov. 22, 1990.*

* cited by examiner

*Primary Examiner*—Deborah Yee
(74) *Attorney, Agent, or Firm*—Kenyon & Kenyon LLP

(57) ABSTRACT

Deformed wire for a submarine optical fiber cable used for the pressure-proof layer of the submarine optical cable and having a high strength, that is, having a tensile strength of 1800 MPa or more, is provided, which deformed wire for reinforcing submarine optical fiber cable is characterized by including, by wt %, C: more than 0.65% to 1.1%, Ceq=C+1/4Si+1/5Mn+4/13Cr satisfying 0.80%≦Ceq≦1.80%, having a number of shear bands cutting across an L-section center axial line of 20/mm per unit length of the center axis, having an angle formed by the center axis and shear bands in the range of 10 to 90°, having a tensile strength of 1800 MPa or more, having a sectional area forming an approximately fan shape, a plurality of the approximately fan shapes being combined to form a circular hollow cross-section for accommodating optical fibers, having at its surface a pebbled surface comprised of relief shapes of depths of 0.2 to 5 μm, and having a weld at least at one location in the longitudinal direction.

2 Claims, 6 Drawing Sheets

(a)

(b)

DEFORMED WIRE FOR REINFORCING MARINE OPTICAL FIBER CABLE

TECHNICAL FIELD

The present invention relates to deformed wire for reinforcing submarine optical fiber cable.

BACKGROUND ART

As a structure of a submarine cable having optical fibers as transmission lines, for example, ones of the structures shown in FIG. 1 or FIG. 2 have been proposed.

These structures will be explained below. 1 is a bundle of optical fibers obtained by twisting together a plurality of optical fibers 1*a* or such a bundle buried in an ultraviolet curing synthetic resin (ultraviolet curing urethane) or such a bundle buried in a thermoplastic synthetic resin with a tension-bearing member 1*b* passed through the center of the optical fibers. 2 is a pressure-proof layer for protecting the optical fiber unit 1 from water pressure, while 3 is a tension-bearing layer mainly formed by twisting together steel wire (piano wire) so as to be able to handle the tension applied to the cable.

This tension-bearing member layer 3 is made a single-layer or multiple-layer structure, has a tension-bearing ability enabling it to withstand the tensile load due to the weight of the cable itself at the time of laying or retrieving the cable, and acts to protect the cable from outside damage.

4 is a metal layer air-tight with the bundle of the tension-bearing member layer 3 and forming a power feed conduit to a repeater. Normally, it is comprised of a metal tape made of copper, aluminum, etc. attached longitudinally, welded together, and reduced in diameter (shrunk) to form it into a tube.

Further, 5 and 6 are insulating layers (sheaths) meant for insulation from the seawater and formed by low density and high density polyethylene etc.

Among these cables, the one shown in FIG. 1 uses a combination of three approximately fan-shaped deformed wires as the pressure-proof layer 2. Further, in FIG. 2, the tension-bearing member layer 3 is configured to form a pressure-proof shell by the interaction of the tension-bearing wires wound in two layers.

The tension-bearing ability of the submarine optical cable is mainly provided by the pressure-proof layer 2 and the tension-bearing member layer 3. The tensile strength of the steel wire (piano wire) used for the tension-bearing members 3 is of a level of 2200 MPa. On the other hand, for the approximately fan-shaped deformed wire used for the pressure-proof layer 2, as high strength deformed wire for submarine optical cable using for example wire rod for long, high tension steel wire superior in weldability and cold workability, Japanese Examined Patent Publication (Kokoku) No. 7-65142 proposes deformed wire with an approximately fan-shaped cross-section having a tensile strength of at least 1226 MPa produced from steel wire defined as Ceq=C+(Mn+Cr)/5≧0.57%. However, the maximum value of the tensile strength achieved is on the level of 1520 MPa. This is currently lower than the tensile strength of piano wire.

In recent years, an increased communication capacity has been demanded from submarine cable systems. To meet with the increase in communication capacity, higher performance of optical fibers and an increased number of optical fibers accommodated in submarine optical cable have been demanded.

Along with the increase in the number of optical fibers accommodated, the optical fiber units have increased in outside diameter. Therefore, the inside diameter of the pressure-proof layer 2 has become greater. To prevent the cable outside diameter from increasing along with this, the thickness of the pressure-proof layer 2 has to be made smaller, so the tension-bearing ability of the cable drops. If the tension-bearing ability drops, since the tension-bearing ability is designed to handle the tensile load due to the weight of the cable itself at the time laying or retrieving the cable, there is the problem that the tension-bearing ability of the cable has to be kept from being exceeded by making the depth of use of the cable shallower.

On the other hand, if not changing the thickness of the pressure-proof layer 2, the outside diameter of the pressure-proof layer 2 becomes larger. In this case, there is the problem that along with the increase in the outside diameter of the pressure-proof layer 2, the tension-bearing ability of the cable has to be kept from being exceeded by making the depth of use of the cable shallower.

Further, along with an increase in the communication capacity and an increase in the number of fibers, the processing capability and number of amps required in the repeaters increase and the amount of power supplied to the repeaters increase. A repeater is supplied with power from a station on land through the metal layer 4 serving as the power feed conduit. Along with an increase in the amount of fed power, the voltage applied at the station also becomes high, so a reduction in the conduction resistance of the metal layer 4 forming the power feed conduit is required. To reduce the conductor resistance of the metal layer 4, it is necessary to increase the cross-sectional area of the metal layer 4. This means an increase in the thickness of the metal layer 4, so the weight of the cable increases.

To solve the problem of an increase in the weight of the cable or a decline in the tension-bearing ability being accompanied with the depth of use of the cable becoming shallower, the tension-bearing members of the cable have to be raised in strength.

DISCLOSURE OF INVENTION

The present invention provides deformed wire for submarine optical fiber cable using wire rod for long, high tension steel wire superior in weldability and cold workability, used for the pressure-proof layer 2 of the submarine optical cable, and high in strength, that is, having a tensile strength of 1800 MPa or more.

The present invention was made to achieve this object and has as its gist the following:

(1) Deformed wire for reinforcing submarine optical fiber cable characterized by including, by wt %, C: more than 0.65% to 1.1%, Si: 0.15 to 1.5%, and Mn: 0.20 to 1.5% and further including one or two or more of Cr: 1.2% or less, where (Mn+Cr): 0.2 to 1.5%, Mo: 0.01 to 0.1%, V: 0.01 to 0.1%, Al: 0.002 to 0.1%, Ti: 0.002 to 0.1%, Nb: 0.001 to 0.3%, and B: 0.0005 to 0.1%, where a total of (Mo+V+Al+Ti+Nb+B) is 0.0005 to 0.5%, and a balance of Fe and unavoidable impurities, Ceq=C+1/4Si+1/5Mn+4/13Cr satisfying 0.80%≦Ceq≦1.80%, being a ferrite-pearlite structure or pearlite structure, having a number of shear bands cutting across an L-section center axial line (shear bands having inclination with respect to rolling direction) of 20/mm per unit length of the center axis, having an angle formed by the center axis and shear bands in the range of 10 to 90°, having a tensile strength of 1800 MPa or more, having a sectional area forming an approximately fan shape, a plurality of the approximately fan shapes being combined to form a circular hollow cross-section for accommodating optical fibers, having at its surface a pebbled surface comprised of relief shapes of depths of 0.2 to 5 μm, and having a weld at least at one location in the longitudinal direction.

(2) Deformed wire for reinforcing submarine optical fiber cable characterized by including, by wt %, C: more than 0.65% to 1.1%, Si: 0.15 to 1.5%, and Mn: 0.20 to 1.5% and further including one or two or more of Cr: 1.2% or less, where (Mn+Cr): 0.2 to 1.5%, Mo: 0.01 to 0.1%, V: 0.01 to 0.1%, Al: 0.002 to 0.1%, Ti: 0.002 to 0.1%, Nb: 0.001 to 0.3%, and B: 0.0005 to 0.1%, where a total of (Mo+V+Al+Ti+Nb+B) is 0.0005 to 0.5%, and a balance of Fe and unavoidable impurities, Ceq=C+1/4Si+1/5Mn+4/13Cr satisfying 0.80%≦Ceq≦1.80%, being a ferrite-pearlite structure or pearlite structure, by having Si segregated so as to satisfy a Si maximum segregation degree of the cementite/ferrite interface in the range of 30 nm to the ferrite phase side from the cementite and ferrite interface of the pearlite structure (maximum Si concentration/Si content of bulk in range of 30 nm to ferrite phase side from cementite and ferrite interface)≧1.1, having a number of shear bands cutting across an L-section center axial line (shear bands having inclination with respect to rolling direction) of 20/mm per unit length of the center axis, having an angle formed by the center axis and shear bands in the range of 10 to 90°, having a tensile strength of 1800 MPa or more, having a sectional area forming an approximately fan shape, a plurality of the approximately fan shapes being combined to form a circular hollow cross-section for accommodating optical fibers, having at its surface a pebbled surface comprised of relief shapes of depths of 0.2 to 5 μm, and having a weld at least at one location in the longitudinal direction.

BRIEF DESCRIPTION OF THE DRAWINGS

FIG. 1(*b*) is a sectional view of the same.

BEST MODE FOR CARRYING OUT THE INVENTION

Figure 1:
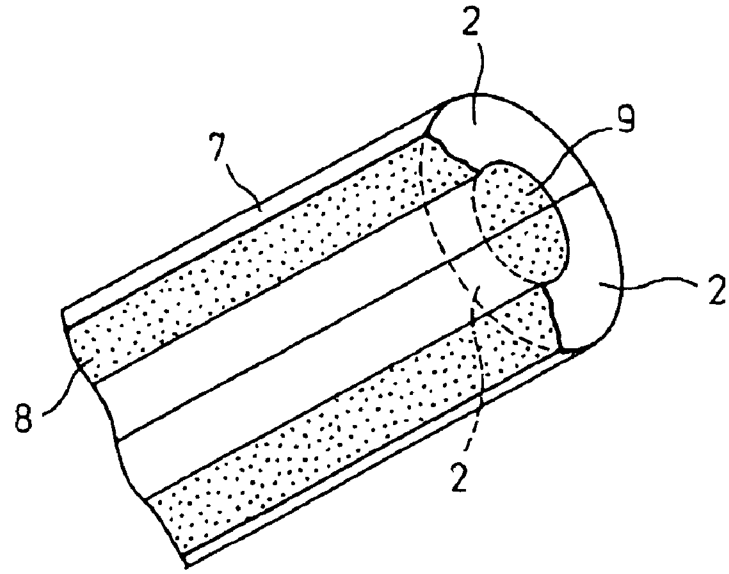
FIG. 1(*a*) is a perspective view of a submarine cable formed with a pressure-proof layer using approximately fan-shaped deformed wires.
Figure 1:
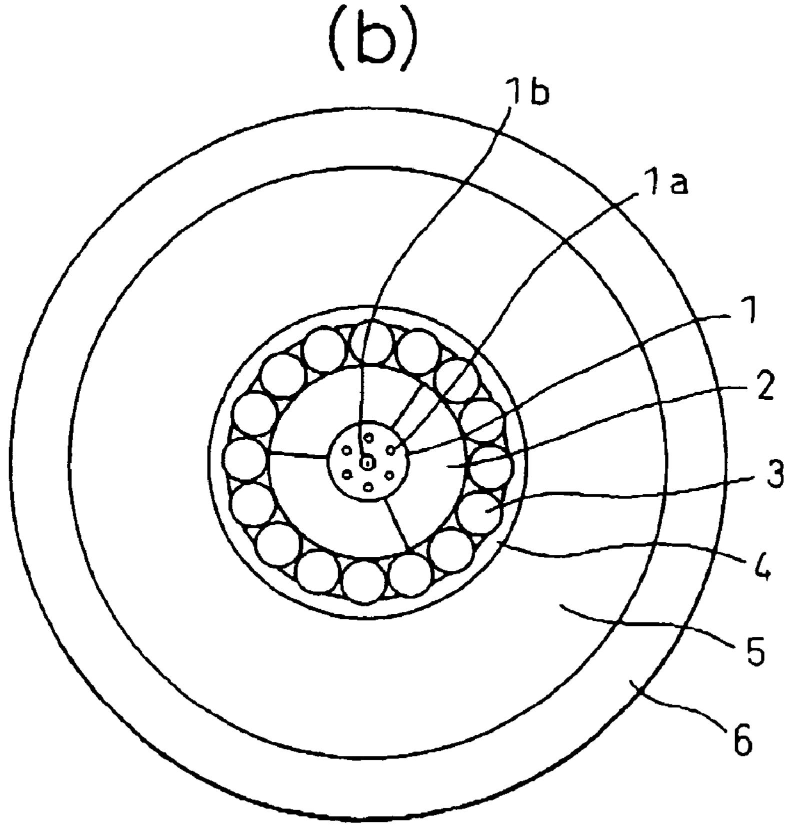

Below, the present invention will be described in detail.

As explained above, to raise the strength of the tension-bearing members of cable, the tensile strength of the approximately fan-shaped deformed wire must be made at least 1800 MPa.

The tensile strength of approximately fan-shaped deformed wire is determined by the tensile strength of the original wire rod and the amount of cold working, but the biggest problem at the time of producing approximately fan-shaped deformed wire is the breaks occurring during working. Raising the strength without breaks is the point of the present invention. According to studies of the inventors, for example, it was learned that to produce approximately fan-shaped deformed wire 2 for reinforcing the submarine optical fiber cable shown in FIG. 1 while achieving a higher strength and without breaks during working, it is important to control the shear bands having inclination with respect to the rolling direction. For this, for example, it is effective that the total reduction rate be suppressed to not more than 85% in the case of a tensile strength of the approximately fan-shaped deformed wire of 1800 MPa and to not more than 80% in the case of 2000 MPa. To satisfy these conditions, it is necessary that the tensile strength of the rolled wire rod be at least 1100 MPa in the case of a tensile strength of the approximately fan-shaped deformed wire of 1800 MPa and at least 1200 MPa in the case of 2000 MPa.

Further, the inventors discovered that breaks of the approximately fan-shaped deformed wire during production occur due to strain ageing arising due to the free carbon in solid solution in the steel material and the free nitrogen in solid solution in the steel material derived from the breakdown of cementite due to the heat produced during cold working. Therefore, they studied additional alloys for suppressing cementite breakdown due to the heat of working and the optimal amounts of addition and as a result discovered that adjusting the amount of Si present at the cementite/ferrite interface in the ferrite was effective and, together, that supplementary addition of alloy elements forming carbides of Cr, Mo, V, Ti, and Nb further enabled the breakdown of cementite during cold working to be suppressed.

Further, they discovered that reducing the nitrogen in the steel material and immobilizing the unavoidable nitrogen in solid solution by the carbides of Mo, Al, Ti, Nb, V, and B was effective for suppressing strain ageing due to nitrogen.

Further, the above steel material is required to be superior in strength and toughness, including at the welds, when welding and cold working the original wire rods to form the approximately fan-shaped deformed wire. The C, Si, Mn, and Cr added for the purpose of raising the strength tend to form structures resulting in deterioration of the cold workability of the mother material and welds when the amounts added increase, so it is preferable to define optimal ranges giving a balance of higher strength and cold workability.

As explained above, in the present invention, ranges of the component elements are defined to satisfy all of the requirements of high strength and good weldability and cold workability. The reasons for limitation of the ranges are explained below.

C is preferably lower from the viewpoint of the weldability, but if 0.65% or less, a tensile strength of 1100 MPa or more cannot be secured. On the other hand, if over 1.1%, the segregation in the continuous casting process becomes greater and micromartensite and pro-eutectoid cementite remarkably deteriorating the cold workability occur in the rolled wire rods, so the C content is made more than 0.65% to 1.1%.

Si is effective for strengthening the wire rods due to the solid solution hardening action. If 0.15% or less, that effect cannot be obtained. Further, if over 1.5%, the toughness is degraded, so the range is made 0.15% to 1.5%.

Figure 3:
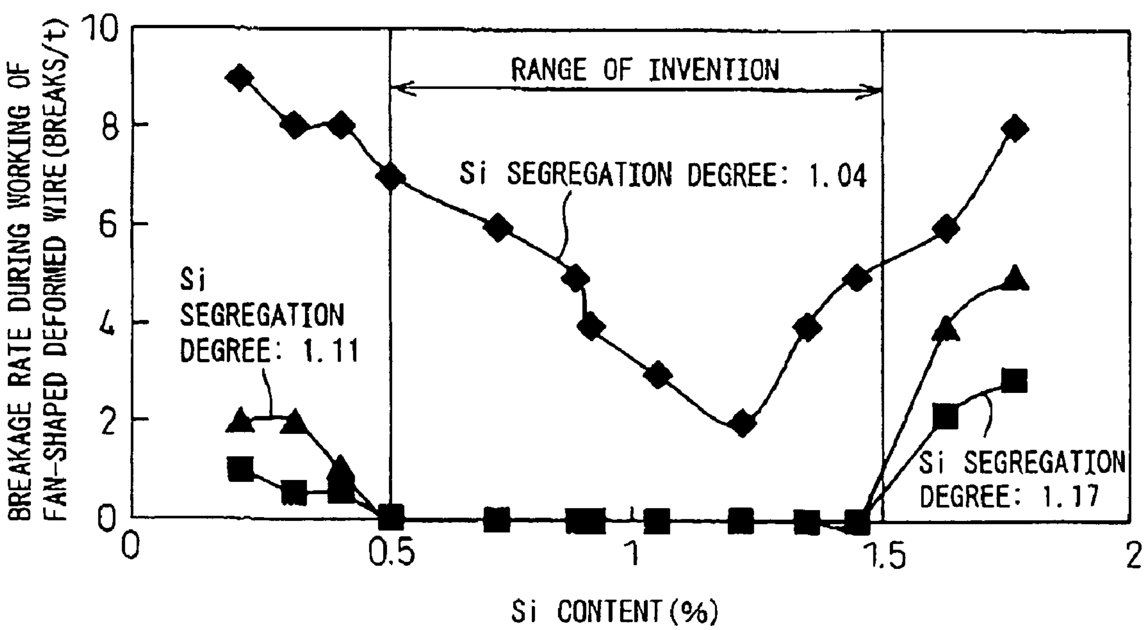
FIG. 3 is a view of the effects on the workability of approximately fan-shaped deformed wire by the content of Si and the presence of Si in the ferrite phase in TS=2100 MPa class approximately fan-shaped deformed wire.
Figure 4:
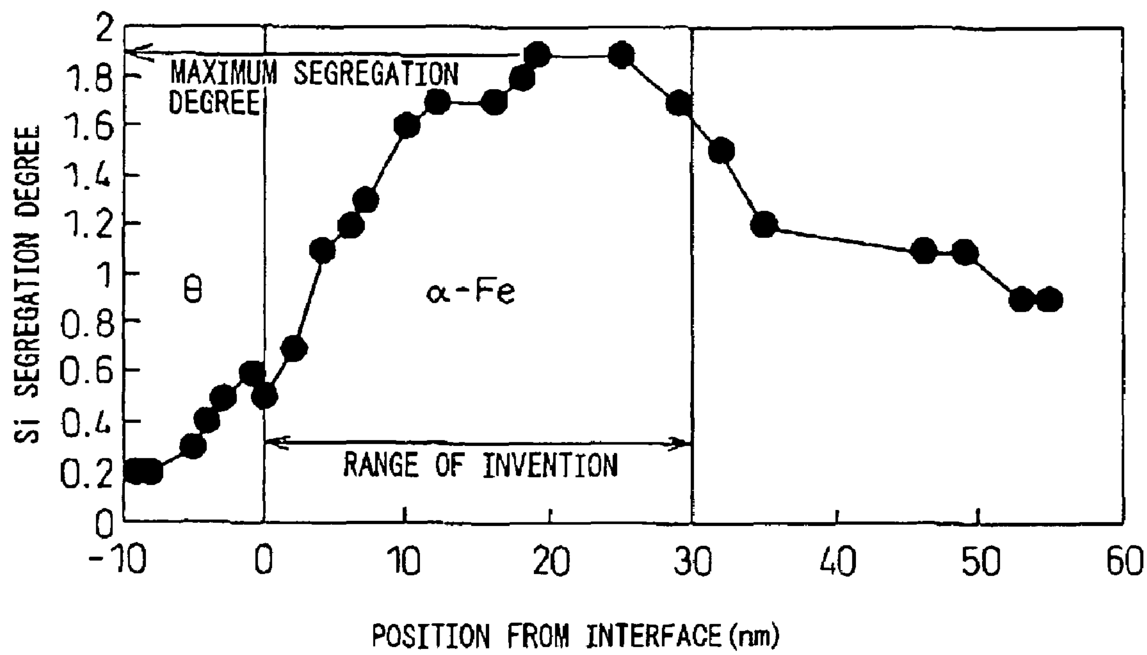
FIG. 4 is a view of an example of measurement, by an AP-FIM, of the state of distribution of Si in the pearlite structure of approximately fan-shaped deformed wire of 0.82% C-1.02% Si-0.52% Mn-0.0042% Al.

In particular, to prevent breaks during deformed working, as explained above, to suppress strain ageing due to C during the cold working, the breakdown of cementite and the solid solution of C in the ferrite during cold working have to be suppressed. For this reason, it is necessary to make the content of Si 0.5% to 1.5% and control the Si to be present so as to satisfy an Si maximum segregation degree of the cementite/ferrite interface in the range of 30 nm to the ferrite phase side from the cementite and ferrite interface of the pearlite structure (maximum Si concentration/Si content of bulk in range of 30 nm to ferrite phase side from cementite and ferrite interface)≧1.1. FIG. 3 shows the effect on the workability of approximately fan-shaped deformed wire of the content of Si of approximately fan-shaped deformed wire with a tensile strength of 2100 MPa and the state of presence of Si at the ferrite phase. If in the range of the present invention, no breaks occurs during working. Further, the state of distribution of the Si segregation degree at the cementite/ferrite interface can be measured and found by an AP-FIM etc. as shown in for example FIG. 4. In particular, when the tensile strength is 2000 MPa or more, it is preferable to define the Si in the above range.

To make the Si efficiently segregate at the cementite/ferrite interface, for example it is effective to raise the pearlite transformation temperature to an extent where no rough cementite causing the wire drawing to degrade is precipitated, prolong the time until the end, and increase as much as possible the amount of Si discharged to the ferrite phase side at the time of cementite precipitation. For this, it is effective to reduce the cooling rate of the air blast cooling after rolling the wire rod to not more than 1 to 10° C.

Mn is an element with little effect on the weldability, increasing the strength, immobilizing the S as sulfide, and suppressing the heat embrittlement during rolling of the wire rod and is preferably added to the allowable range. If Mn is less than 0.2%, it is not possible to immobilize the S as a sulfide or 1100 MPa or more of tensile strength of the wire rod cannot be secured. On the other hand, if over 1.5%, the quenchability of the wire rod becomes too high, micromartensite is produced, and the workability is remarkably degraded in some cases, so the content was limited to the range of 0.2% to 1.5%.

Cr is an element having exactly the same actions as Mn. It is possible to replace part of the Mn by adding this. Further, in addition to making the pearlite finer and raising the strength of the wire rod, as explained above, this is an element forming carbide and promoting stability of the cementite. If Cr is more than 1.2% and further the total of Mn and Cr is over 1.5%, micromartensite is produced, so Cr is limited to not more than 1.2% and (Cr+Mn) to the range of 0.2 to 1.5%.

Mo, Al, V, Ti, Nb, and B are all elements adjusting the γ-granularity and also, as explained above, forming carbides and nitrides and promoting the stability of cementite and immobilization of the solid solution nitrogen. With Mo: less than 0.01%, Al: less than 0.002%, V: less than 0.01%, Ti: less than 0.002%, Nb: less than 0.001%, and B: less than 0.0005% and the total of (Mo+V+Al+Ti+Nb+B) of less than 0.00051 of the one or two or more types of the same, the effect cannot be obtained. With Mo: more than 0.1%., Al: more than 0.1%, V: more than 0.1%, Ti: more than 0.1%, Nb: more than 0.3%, and B: more than 0.1% and the total of one or two or more types of over 0.5%, the effect is saturated and the toughness degraded, so the total of the one or two or more types of Mo: 0.01 to 0.1%, V: 0.01 to 0.1%, Al: 0.002 to 0.1%, Ti: 0.002 to 0.1%, Nb: 0.001 to 0.3%, and B: 0.0005 to 0.1% was limited to 0.0005 to 0.5%.

P and S are both preferably not more than 0.03% from the viewpoint of degradation of the toughness. N is preferably suppressed to not more than 0.01% from the viewpoint of suppression of ageing.

The strength of the original wire rod is determined by Ceq=C+1/4Si+l/5Mn+4/13Cr and the cooling rate of the wire rod from the austenite region. The higher the Ceq and the higher the cooling rate, the greater the strength of the wire rod, but according to studies by the inventors, it was learned that unless Ceq is 0.80% or more, a wire rod having a strength of 1100 MPa or more cannot be obtained, so Ceq was limited to 0.80% at a tensile strength of the approximately fan-shaped deformed wire or 1800 MPa or more. This is because with a Ceq lower than this, to secure the strength of the wire rod, a need arises to make the cooling rate of the wire rod extremely fast and therefore precipitation of bainite or martensite harmful to the cold workability cannot be avoided.

Further, with a Ceq of more than 1.80%, the quenchability of the wire rod rises and even if the cooling rate of the wire rod is adjusted, bainite and martensite harmful to the cold workability are precipitated and the workability is remarkably degraded, so 1.80% was made the upper limit.

Figure 5:
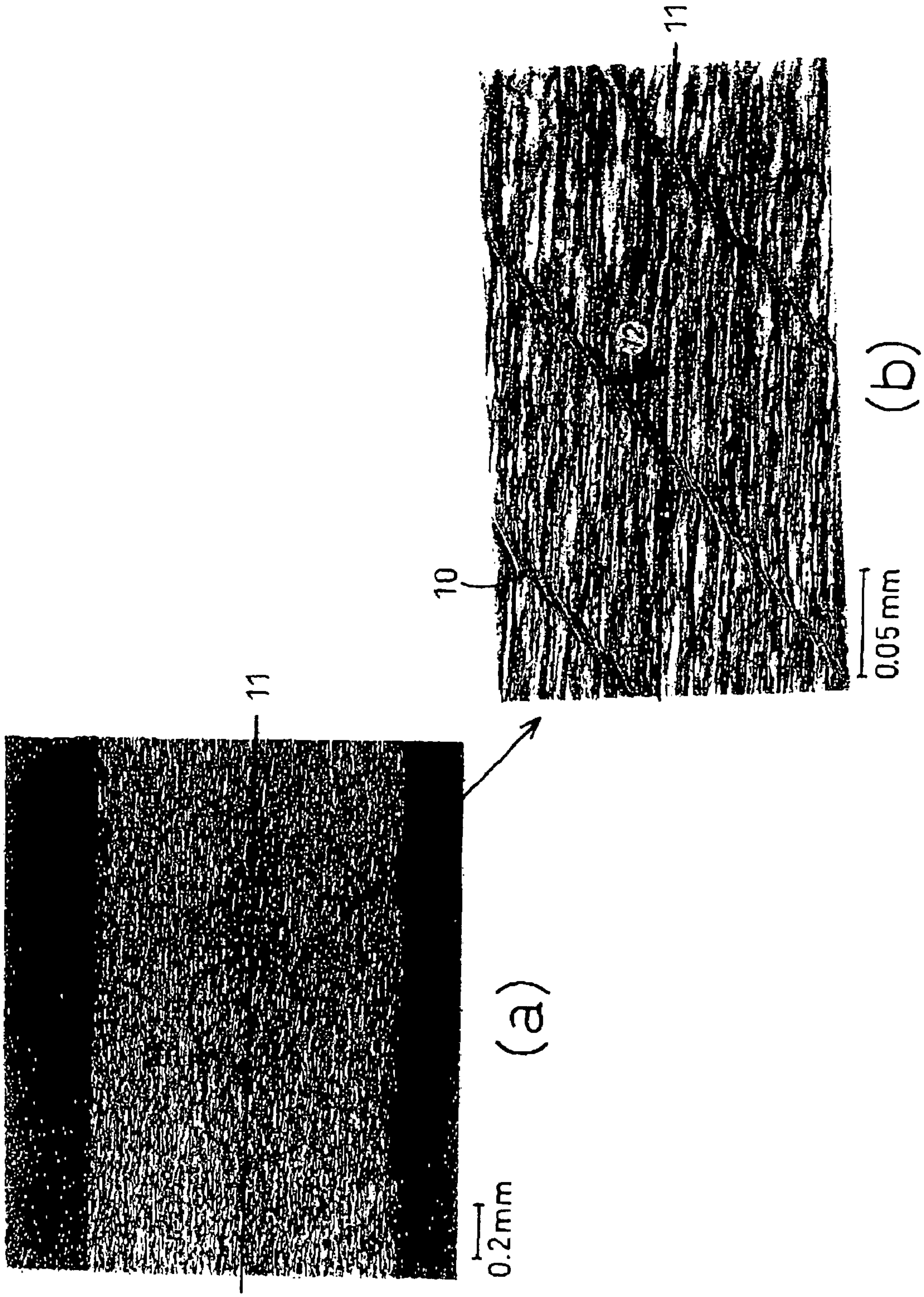
FIG. 5(*a*) and FIG. 5(*b*) are photos of L-section structures of approximately fan-shaped deformed wire.
Figure 7:
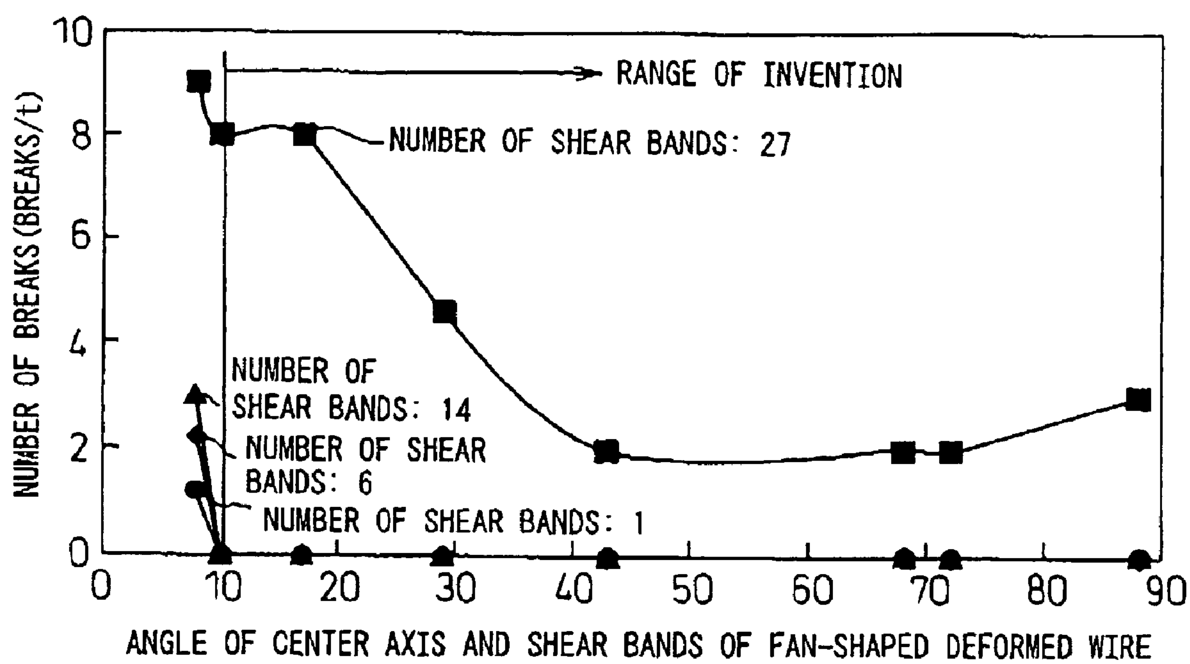
FIG. 7 is a view of the effects on breaks of approximately fan-shaped deformed wire by the number and angle of shear bands cutting across the L-section center axial line of approximately fan-shaped deformed wire.

When drawing a wire into a round wire by a die, a fiber structure aligned in the axial direction develops. When producing approximately fan-shaped deformed wire, in general, since rollers having approximately fan-shaped calibers are used for cold rolling, as shown in FIG. 5, in addition to the structure aligned parallel to the axial direction, shear bands 10 having inclinations with respect to the rolling direction are formed. The pearlite lamellar spacings of the shear bands 10 are much finer than the lamellar spacings of the pearlite aligned in the rolling direction. The working strain therefore concentrates locally. Therefore, when the ductility of the shear bands 10 is lower than the surroundings, in the worst case, breaks 13 occur starting from the shear bands 10 during the working. Further, this becomes a cause of a drop in ductility of the approximately fan-shaped deformed wire itself. Therefore, the presence has to be reduced as much as possible. Even when unavoidably present, it is important that the angle 12 formed by the shear bands 10 and the center axis 11 not become an extremely small angle. A small angle would mean that the state of deformation at the outside diameter side and inside diameter side of the approximately fan shape during rolling would become greatly different and strain would concentrate at the shear bands more and the ductility would drop. As shown in FIG. 7, it is possible to suppress breaks during working by making the number of shear bands cutting across the L-section center axial line 11 of the approximately fan-shaped deformed wire not more than 20/mm per unit length of the center axis 12 and making the angle formed by the center axis 11 and shear bands the range of 10 to 90°. Further, the inclination of the shear bands sometimes is toward the rolling direction and sometimes toward the opposite direction depending on the caliber conditions of the cold rolling, but the angle formed by the shear bands and center axis is set so that the smaller angle is in the range of 10 to 90° regardless as to the rolling direction.

As a technique for suppressing the occurrence of such shear bands 10, for example, as explained above, it is possible to reduce the total reduction rate along with the rise in the strength of the approximately fan-shaped deformed wire. However, in the conventionally commercialized 5.0 mm diameter wire rod, there are limits to reduction of the reduction rate at the time of cold working. By cold working wire rods of diameters of less than 5.0 mm, for example, 4.5 mm, 4.0 mm, and 3.0 mm, to produce approximately fan-shaped deformed wire, the reduction rate can be reduced. Further, by the effect of the increase of the amount of working during rolling of the wire rod by making the diameter not more than 5.0 mm, the γ-granularity becomes finer and the granularity can be reduced to #8 or better in terms of the γ-granularity number. An effect of improvement of the ductility is exhibited more than by just reducing the reduction rate. Further, as explained above, adjusting the amount of addition of Si and suppressing the strain ageing during wire drawing are also effective.

Further, to suppress the occurrence of shear bands 10 and control the angle 12, it is effective to adjust the caliber shapes of the upper and lower rolling rollers so that the relative speeds between the outside diameter side and inside diameter side of the substantial fan shapes do not become very different.

Figure 6:
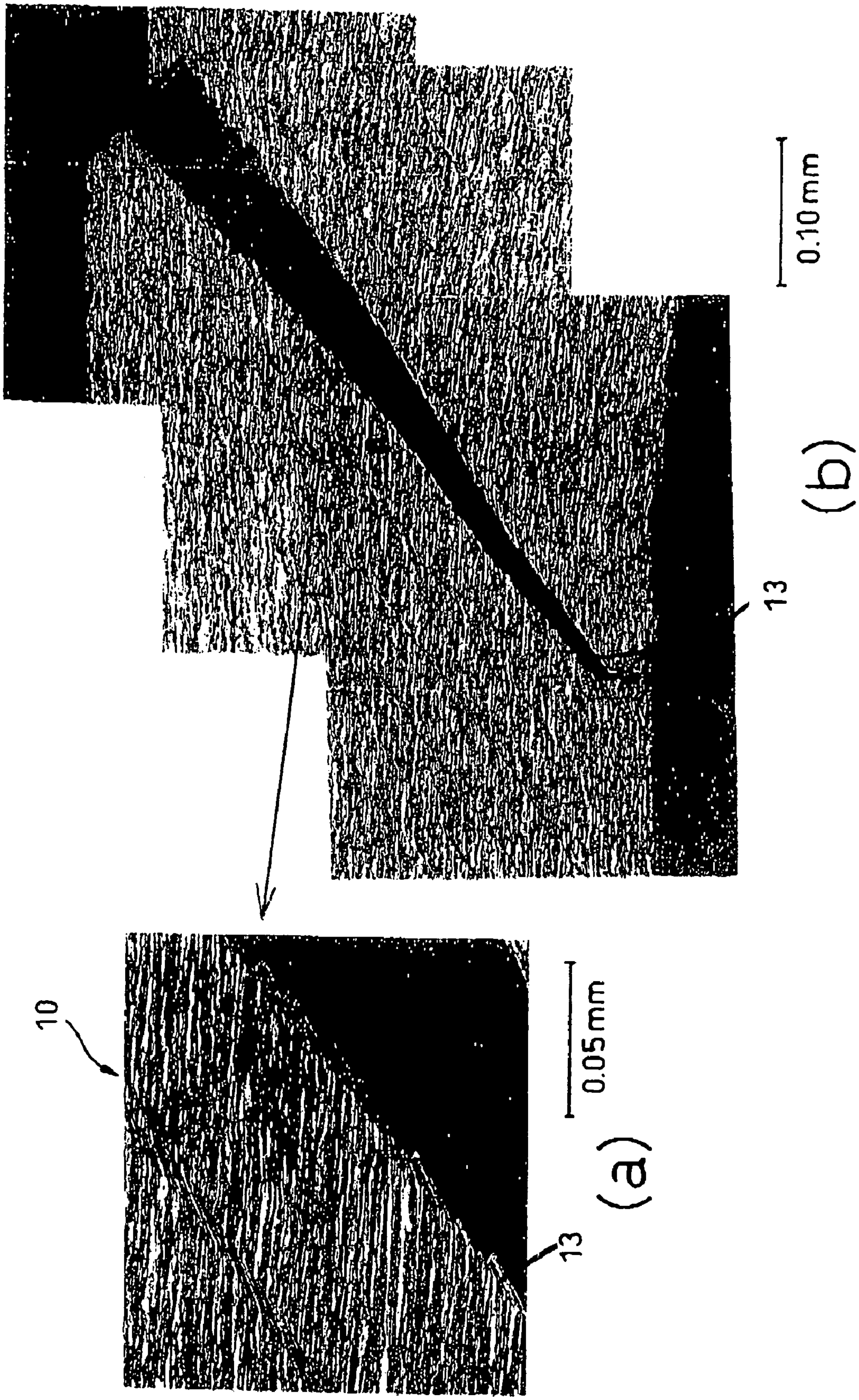
FIG. 6(*a*) and FIG. 6(*b*) are photos of examples of breaks during working of approximately fan-shaped deformed wire.

Further, the example of the break of FIG. 6 shows the case where the angle of the shear bands satisfies the range of the present invention, but the number of shear bands is 24.3/mm per unit length or over the range of the present invention. This results in the break.

As explained above, to produce submarine cable having a total length of about 50 to 100 km, when deeming, as a composition having a good weldability and a good workability over the entire length, including welds, in a 2t unit weight wire rod and securing a strength of at least the 1800 MPa class when working the rod to approximately fan-shaped deformed wire, Ceq=C+1/4Si+1/5Mn+4/13Cr, it is effective to adjust Ceq to a range of 0.80%. to 1.80%.

Further, the welds and their vicinity are heated to at least the $A_1$ point, then rapidly cooled, so with just welding, the result would be a hard martensite structure and the cold workability would remarkably be degraded, therefore after welding, heat treatment is necessary to reheat the welds to the austensite region again and cool them.

For example, as the reinforcing pressure upset welding conditions, the wire rod is heated under conditions of the $A_1$ point temperature+50° C. or more at a wire rod diameter D (unit: mm) for at least 5×D (unit: sec), then subjected to the reinforcing pressure upset welding. The weld is reheated in a temperature range of the $A_1$ point temperature+50° C. or more to +300° C. or more at the wire rod diameter D (unit: mm) for a heating time of 5×D (unit: sec) or more. Alternatively, after reheating at the time of annealing, the wire rod is preferably cooled under conditions of a cooling rate of 3 to 20° C./sec in the range of the nose temperature of the TTT curve to the nose temperature of the TTT curve+50° C., then held for at least 5 seconds to not more than 5 minutes in the range of the nose temperature of the TTT curve to the nose temperature of the TTT curve+50° C., then cooled at a cooling rate of at least 3° C./sec.

In welding of wire rod, the problem becomes securing a structure achieving the above mentioned target in the annealing process after welding. In general, after butt welding, the weld is reheated.to the γ-region, then the cooling rate is controlled for cooling and the annealing is performed. At this time, if the Ceq is less than 0.80%, a structure with a good weldability and workability can be secured, but a wire rod having a strength of the weld of at least 1100 MPa cannot be obtained and a tensile strength of the approximately fan-shaped deformed wire of 1800 MPa or more cannot be secured, so the Ceq was limited to 0.80%. With a Ceq lower than this, to secure the strength of the wire rod, a need arises to raise the cooling rate at the time of annealing to an extremely high level and precipitation of bainite and martensite harmful to cold workability is unavoidable.

Further, with a Ceq over 1.80%, the quenchability of the wire rod rises and even if adjusting the cooling rate at the time of annealing, bainite and martensite harmful to the cold workability precipitate and the workability of the welds is remarkably degraded, so the limit was made 1.80%.

Further, as other methods for welding the rolled wire rod to make long wire rod, there are the reinforcing pressure upset method, TIG method, laser method, etc., but the method is not particularly limited.

However, heat-affected zones unavoidably arise even with heat treatment after welding, so the lamellar cementite breaks down and forms spheres due to the heat effect. Even at the stage of wire rod, the strength is low compared with the mother material. Further, the amount of work hardening during the cold working is low. Therefore, the difference in strength between the mother material and the heat-affected zones of the deformed wire becomes greater than the difference in strength between the mother material and the heat-affected zones at the stage of wire rod. This trend becomes remarkable as the approximately fan-shaped deformed wire becomes higher in strength.

As the means for solving these problems, for example, it is effective to weld the billets before rolling into wire rod at the temperature of the austenite region right after heating at the heating furnace, then roll to wire rod. There are then almost no problems of the heat effect due to hot welding the billets. By producing approximately fan-shaped deformed wire from over 2t large unit weight wire rod coils with uniform structure and mechanical properties, the variation in mechanical properties of the deformed wire can be greatly reduced.

As the method for hot welding the billets, the flash butt, reinforcing pressure upset, TIG, laser, or other method may be used, but this is not particularly limited. If considering guarantee of a drop in temperature of the billet at the time of welding, it is necessary to weld after heating to at least 1000° C.

The cable for a submarine cable, as shown in the above FIG. 1, prevents running of water by filling the clearance between the optical fiber unit 1 and pressure-proof layer 2 or the pressure-proof layer 2 and the metal layer 4 with a compound. Here, for example, as shown in FIG. 1, if the inner circumference 9 of the approximately fan-shaped deformed wire 2 is given a pebbled finish, the coefficient of friction with the compound increases and the ability to prevent running of water is improved.

Further, if the side faces 8 of the approximately fan-shaped deformed wire 2 are worked to a pebbled finish, when combining approximately fan-shaped deformed wires to form the pressure-proof layer, the structural stability of the pressure-proof layer is increased.

This pebbled surface has relief shapes of depths of about 0.2 to 5 μm and is imparted by giving the roll surface in the final step of the process of production of the approximately fan-shaped deformed wire a pebbled surface or shot blasting the surface of the deformed wire.

Further, as to the number of the approximately fan-shaped deformed wires, FIG. 1 shows the fan shapes when dividing a circle into three equal parts, but the invention is not limited to division into three equal parts. It is possible to provide a plurality of divided fan shapes according to the application and conditions of use. Further, two to 1.0 fan shapes are desirable from the industrial standpoint.

EXAMPLES

Example 1

Figure 2:
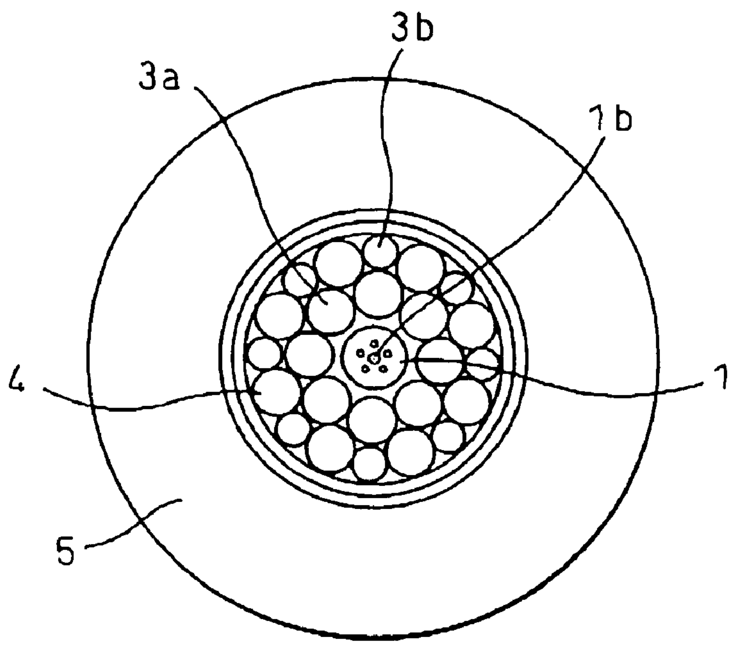
FIG. 2 is a sectional view of a submarine cable formed with a pressure-proof layer using only piano wire.

The deformed wire for reinforcing submarine optical cable having the above characteristics is obtained by for example heating to 1050° C. 2t unit weight billets containing 0.82% C-1.0% Si-0.50% Mn-0.0045% Al (Ceq=1.23%), then flash butt welding two billets hot, then rolling them to a diameter of 4.0 mm and air blast cooling at 7° C./s or so to obtain a unit weight 4t wire rod coil adjusted to a tensile strength of 1300 MPa. Next, the scale is removed, then the wire rod is given a phosphor zinc coating, drawn by a die to 3.0 mm, then hot rolled by rollers to a rectangular cross-section wire rod of a thickness of 1.8 mm. Next, to obtain the substantial fan shape, the wire rod is cold rolled by rollers having approximately fan shaped calibures to obtain an approximately fan-shaped deformed wire 2 of a length of 60 km having an outside diameter b: 5.2 mm, inside diameter a: 2.55 mm, thickness t: 1.325 mm, tensile strength 1820 MPa, and pebbled surface relief depth of an average 1 μmm such as shown in the submarine optical fiber cable of FIG. 2. There are no shear bands in the L-section microstructure of this approximately fan-shaped deformed wire.

Table 1 to Table 6 (Table 2 to Table 6 are continuations of Table 1) show the compositions, the Ceq, and the TS of the wire rod, the workability when working the wire rod to deformed wire, the strength of the deformed wire, the number of deformed wires forming the protective layer, etc.

TABLE 2

| Test No. | Properties of wire rod: Wire dia. (mm) | TS of wire rod (MPa) | Structure of wire rod | Welding means | TS of weld (MPa) | Structure of weld |
|---|---|---|---|---|---|---|
| Invention examples | | | | | | |
| 1 | 6.30 | 1131 | α + P | Reinforcing pressure upset | 1118 | α + P |
| 2 | 6.00 | 1176 | P | Reinforcing pressure upset | 1162 | P |
| 3 | 5.00 | 1298 | P | Laser | 1279 | P |
| 4 | 4.50 | 1410 | P | Laser | 1388 | P |
| 5 | 4.00 | 1552 | P | Flash butt | 1524 | P |
| 6 | 5.00 | 1325 | P | Flash butt | 1306 | P |
| 7 | 5.00 | 1399 | P | TIG | 1379 | P |
| 8 | 5.50 | 1247 | P | TIG | 1231 | P |
| 9 | 5.50 | 1262 | P | Reinforcing pressure upset | 1246 | P |
| 10 | 5.00 | 1342 | P | Reinforcing pressure upset | 1323 | P |
| 11 | 5.00 | 1345 | P | Laser | 1326 | P |
| 12 | 5.00 | 1303 | P | Laser | 1284 | P |

TABLE 1

| Test No. | Chemical composition (%): C | Si | Mn | Cr | Mn + Cr | Ceq | Al | Ti | Mo | V | Nb | B | V + Al + Ti + Mo + Nb + B |
|---|---|---|---|---|---|---|---|---|---|---|---|---|---|
| Invention examples | | | | | | | | | | | | | |
| 1 | 0.67 | 0.22 | 0.80 | | 0.80 | 0.89 | 0.042 | | | | | | 0.042 |
| 2 | 0.72 | 0.20 | 0.75 | | 0.75 | 0.92 | 0.044 | | | | | | 0.044 |
| 3 | 0.82 | 0.21 | 0.77 | | 0.77 | 1.03 | 0.035 | | | | | | 0.035 |
| 4 | 0.93 | 0.19 | 0.72 | | 0.72 | 1.12 | 0.038 | | | | | | 0.038 |
| 5 | 1.04 | 0.22 | 0.75 | | 0.75 | 1.25 | 0.040 | | | | | | 0.040 |
| 6 | 0.82 | 0.22 | 0.50 | 0.24 | 0.74 | 1.05 | 0.039 | | | | | | 0.039 |
| 7 | 0.82 | 0.19 | 0.22 | 0.72 | 0.94 | 1.13 | 0.025 | | | | | | 0.025 |
| 8 | 0.81 | 0.19 | 0.75 | | 0.75 | 1.01 | | 0.015 | | | | | 0.015 |
| 9 | 0.79 | 0.22 | 0.75 | | 0.75 | 1.00 | 0.022 | 0.020 | | | | | 0.042 |
| 10 | 0.82 | 0.24 | 0.73 | | 0.73 | 1.03 | 0.035 | | 0.043 | | | | 0.078 |
| 11 | 0.83 | 0.24 | 0.65 | | 0.65 | 1.02 | 0.032 | | | 0.055 | | | 0.087 |
| 12 | 0.80 | 0.23 | 0.63 | | 0.63 | 0.98 | 0.031 | | | | 0.052 | | 0.083 |
| 13 | 0.82 | 0.21 | 0.62 | | 0.62 | 1.00 | 0.033 | | | | | 0.043 | 0.076 |
| 14 | 0.83 | 0.19 | 0.64 | | 0.64 | 1.01 | 0.025 | 0.015 | 0.045 | 0.055 | | | 0.140 |
| 15 | 0.80 | 0.22 | 0.65 | | 0.65 | 0.99 | 0.035 | | 0.065 | | 0.035 | | 0.135 |
| 16 | 0.79 | 0.23 | 0.68 | | 0.68 | 0.98 | 0.033 | | 0.042 | | | 0.042 | 0.117 |
| 17 | 0.83 | 0.25 | 0.62 | | 0.62 | 1.02 | 0.022 | 0.015 | 0.035 | 0.052 | 0.045 | 0.004 | 0.173 |
| 18 | 0.92 | 0.21 | 0.77 | | 0.77 | 1.13 | 0.035 | | | | | | 0.035 |
| 19 | 0.92 | 0.21 | 0.77 | | 0.77 | 1.13 | 0.035 | | | | | | 0.035 |
| 20 | 0.92 | 0.21 | 0.77 | | 0.77 | 1.13 | 0.035 | | | | | | 0.035 |
| 21 | 0.92 | 0.21 | 0.77 | | 0.77 | 1.13 | 0.035 | | | | | | 0.035 |
| 22 | 0.92 | 0.21 | 0.77 | | 0.77 | 1.13 | 0.035 | | | | | | 0.035 |
| 23 | 0.92 | 0.21 | 0.77 | | 0.77 | 1.13 | 0.035 | | | | | | 0.035 |
| 24 | 0.92 | 0.21 | 0.77 | | 0.77 | 1.13 | 0.035 | | | | | | 0.035 |
| 25 | 0.92 | 0.21 | 0.77 | | 0.77 | 1.13 | 0.035 | | | | | | 0.035 |
| 26 | 0.92 | 0.65 | 0.53 | | 0.53 | 1.19 | 0.045 | | | | | | 0.045 |
| 27 | 0.92 | 1.20 | 0.52 | | 0.52 | 1.32 | 0.043 | | | | | | 0.043 |
| 28 | 0.92 | 1.45 | 0.53 | | 0.53 | 1.39 | 0.041 | | | | | | 0.041 |
| 29 | 0.92 | 1.00 | 0.32 | 0.21 | 0.53 | 1.30 | 0.039 | | | | | | 0.039 |
| 30 | 0.92 | 1.00 | 0.32 | 0.21 | 0.53 | 1.30 | 0.039 | | | | | | 0.039 |
| 31 | 0.92 | 1.00 | 0.32 | 0.21 | 0.53 | 1.30 | 0.039 | | | | | | 0.039 |
| 32 | 0.92 | 1.00 | 0.32 | 0.21 | 0.53 | 1.30 | 0.039 | | | | | | 0.039 |

TABLE 2-continued

| | Properties of wire rod | | | | | |
|---|---|---|---|---|---|---|
| Test No. | Wire dia. (mm) | TS of wire rod (MPa) | Structure of wire rod | Welding means | TS of weld (MPa) | Structure of weld |
| 13 | 5.00 | 1309 | P | Flash butt | 1290 | P |
| 14 | 5.00 | 1386 | P | Flash butt | 1366 | P |
| 15 | 5.00 | 1359 | P | TIG | 1340 | P |
| 16 | 5.00 | 1339 | P | TIG | 1319 | P |
| 17 | 5.00 | 1432 | P | Reinforcing pressure upset | 1411 | P |
| 18 | 4.50 | 1412 | P | Reinforcing pressure upset | 1390 | P |
| 19 | 4.50 | 1412 | P | Laser | 1390 | P |
| 20 | 4.50 | 1412 | P | Laser | 1390 | P |
| 21 | 4.50 | 1412 | P | Flash butt | 1390 | P |
| 22 | 4.50 | 1412 | P | Flash butt | 1390 | P |
| 23 | 4.50 | 1412 | P | TIG | 1390 | P |
| 24 | 4.50 | 1412 | P | TIG | 1390 | P |
| 25 | 4.50 | 1412 | P | BT hot weld | 1412 | P |

TABLE 2-continued

| | Properties of wire rod | | | | | |
|---|---|---|---|---|---|---|
| Test No. | Wire dia. (mm) | TS of wire rod (MPa) | Structure of wire rod | Welding means | TS of weld (MPa) | Structure of weld |
| 26 | 5.50 | 1422 | P | Reinforcing pressure upset | 1404 | P |
| 27 | 5.50 | 1435 | P | Reinforcing pressure upset | 1416 | P |
| 28 | 5.50 | 1457 | P | Laser | 1438 | P |
| 29 | 5.50 | 1417 | P | Laser | 1399 | P |
| 30 | 4.00 | 1418 | P | Flash butt | 1393 | P |
| 31 | 3.50 | 1419 | P | Flash butt | 1390 | P |
| 32 | 3.00 | 1420 | P | TIG | 1386 | P |

*Structure codes:
α: ferrite,
P: pearlite,
pro-e θ: pro-eutectoid cementite,
B: bainite,
M: martensite

TABLE 3

| | Properties of deformed wire | | | | | | | | | |
|---|---|---|---|---|---|---|---|---|---|---|
| Test No. | OD (mm) | ID (mm) | Reduction rate (%) | TS (MPa) | EL (%) | No. of deformed wires forming protective layer | Si segregation degree of α/θ interface | No. of shear bands | Angle of shear bands | Work-ability |
| | | | | | Invention examples | | | | | |
| 1 | 5.20 | 2.55 | 82.6 | 1830 | 3.2 | 3 | — | 13 | 42 | Good |
| 2 | 5.20 | 2.55 | 80.8 | 1836 | 3.3 | 3 | — | 11 | 43 | Good |
| 3 | 5.20 | 2.55 | 72.3 | 1812 | 3.1 | 3 | — | 7 | 48 | Good |
| 4 | 5.20 | 2.55 | 65.8 | 1840 | 3.2 | 3 | — | 0 | 45 | Good |
| 5 | 5.20 | 2.55 | 56.8 | 1887 | 3.0 | 3 | — | 0 | 43 | Good |
| 6 | 5.20 | 2.55 | 72.3 | 1839 | 2.9 | 3 | — | 7 | 42 | Good |
| 7 | 5.20 | 2.55 | 72.3 | 1913 | 2.9 | 3 | — | 8 | 42 | Good |
| 8 | 5.20 | 2.55 | 77.1 | 1837 | 3.2 | 3 | — | 7 | 45 | Good |
| 9 | 5.20 | 2.55 | 77.1 | 1852 | 3.2 | 3 | — | 8 | 39 | Good |
| 10 | 5.20 | 2.55 | 72.3 | 1856 | 3.3 | 3 | — | 8 | 38 | Good |
| 11 | 5.20 | 2.55 | 72.3 | 1859 | 3.1 | 3 | — | 7 | 43 | Good |
| 12 | 5.20 | 2.55 | 72.3 | 1817 | 3.2 | 3 | — | 8 | 42 | Good |
| 13 | 5.20 | 2.55 | 72.3 | 1823 | 3.0 | 3 | — | 8 | 41 | Good |
| 14 | 5.20 | 2.55 | 72.3 | 1900 | 3.1 | 3 | — | 7 | 45 | Good |
| 15 | 5.20 | 2.55 | 72.3 | 1873 | 3.2 | 3 | — | 8 | 46 | Good |
| 16 | 5.20 | 2.55 | 72.3 | 1852 | 3.0 | 3 | — | 6 | 48 | Good |
| 17 | 5.20 | 2.55 | 72.3 | 1946 | 2.9 | 3 | — | 8 | 43 | Good |
| 18 | 5.20 | 2.55 | 65.8 | 1842 | 3.1 | 3 | — | 8 | 17 | Good |
| 19 | 5.20 | 2.55 | 65.8 | 1842 | 3.1 | 3 | — | 8 | 28 | Good |
| 20 | 5.20 | 2.55 | 65.8 | 1842 | 3.1 | 3 | — | 8 | 58 | Good |
| 21 | 5.20 | 2.55 | 65.8 | 1842 | 3.1 | 3 | — | 8 | 65 | Good |
| 22 | 5.20 | 2.55 | 65.8 | 1842 | 3.1 | 3 | — | 8 | 72 | Good |
| 23 | 5.20 | 2.55 | 65.8 | 1842 | 3.1 | 3 | — | 3 | 42 | Good |
| 24 | 5.20 | 2.55 | 65.8 | 1842 | 3.1 | 3 | — | 17 | 43 | Good |
| 25 | 5.20 | 2.55 | 65.8 | 1842 | 3.1 | 3 | — | 16 | 47 | Good |
| 26 | 5.20 | 2.55 | 77.1 | 2012 | 2.8 | 3 | 1.22 | 12 | 35 | Good |
| 27 | 5.20 | 2.55 | 77.1 | 2025 | 2.9 | 3 | 1.34 | 4 | 39 | Good |
| 28 | 5.20 | 2.55 | 77.1 | 2047 | 3.1 | 3 | 1.56 | 3 | 32 | Good |
| 29 | 5.20 | 2.55 | 77.1 | 2007 | 3.0 | 3 | 1.43 | 6 | 36 | Good |
| 30 | 5.20 | 2.55 | 78.6 | 2035 | 3.0 | 6 | 1.52 | 6 | 31 | Good |
| 31 | 5.20 | 2.55 | 79.1 | 2045 | 3.0 | 8 | 1.77 | 7 | 29 | Good |
| 32 | 5.20 | 2.55 | 77.3 | 2013 | 3.0 | 10 | 1.83 | 5 | 26 | Good |

TABLE 4

| Test | Chemical composition (%) | | | | | | | | | | | | |
|---|---|---|---|---|---|---|---|---|---|---|---|---|---|
| No. | C | Si | Mn | Cr | Mn + Cr | Ceq | Al | Ti | Mo | V | Nb | B | V + Al + Ti + Mo + Nb + B |
| Comp Ex. | | | | | | | | | | | | | |
| 33 | 0.60 | 0.25 | 0.54 | | 0.54 | 0.77 | 0.036 | | | | | | 0.036 |
| 34 | 1.12 | 0.25 | 0.88 | | 0.88 | 1.36 | 0.042 | | | | | | 0.042 |
| 35 | 0.82 | 1.64 | 0.55 | | 0.55 | 1.34 | 0.041 | | | | | | 0.041 |
| 36 | 0.82 | 0.25 | 1.00 | 0.67 | 1.67 | 1.29 | 0.042 | | | | | | 0.042 |
| 37 | 0.82 | 1.03 | 0.53 | | 0.53 | 1.18 | 0.042 | 0.025 | 0.230 | 0.160 | 0.230 | 0.007 | 0.694 |
| 38 | 0.82 | 0.25 | 0.95 | | 0.95 | 1.07 | 0.042 | | | | | | 0.042 |
| 39 | 0.82 | 0.22 | 0.92 | | 0.92 | 1.06 | 0.041 | | | | | | 0.041 |
| 40 | 0.82 | 0.24 | 0.91 | | 0.91 | 1.06 | 0.043 | | | | | | 0.043 |
| 41 | 0.82 | 1.01 | 0.47 | | 0.47 | 1.17 | 0.040 | | | | | | 0.040 |

TABLE 5

| | Properties of wire rod | | | | | |
|---|---|---|---|---|---|---|
| Test No. | Wire dia. (mm) | TS of wire rod (MPa) | Structure of wire rod | Welding means | TS of weld (MPa) | Structure of weld |
| Comp. Ex. | | | | | | |
| 33 | 6.80 | 995 | α + P | TIG | 984 | α + P |
| 34 | 5.00 | 1478 | P + pro-e θ | Reinforcing pressure upset | 1499 | P + pro-e θ + M |
| 35 | 5.00 | 1452 | P + B | Reinforcing pressure upset | 1473 | P + M |
| 36 | 5.00 | 1473 | P + M | Laser | 1494 | P + M |
| 37 | 5.50 | 1428 | P + M | Laser | 1447 | P + M |
| 38 | 5.50 | 1343 | P | Flash butt | 1326 | P |
| 39 | 5.50 | 1328 | P | Flash butt | 1311 | P |
| 40 | 5.50 | 1333 | P | TIG | 1316 | P |
| 41 | 5.50 | 1440 | P | TIG | 1421 | P |

*Structure codes:
α: ferrite,
P: pearlite,
pro-e θ: pro-eutectoid cementite,
B: bainite,
M: martensite Nos. 1 to 32 are examples of the present invention, while the rest are comparative examples. According to present invention, excellent workability of the wire rod is secured and approximately fan-shaped deformed wire of over the 2000 MPa class can be produced.

As shown in Comparative Example No. 33, when the Ceq is lower than the range of the present invention, if trying to suppress breaks by making the total reduction rate not more than 85%, it is not possible to secure a strength of the approximately fan-shaped deformed wire of 1800 MPa or more.

As shown in Comparative Example No. 34, when the C is higher than the range of the present invention, the workability, including the welds, becomes remarkably degraded and approximately fan-shaped deformed wire cannot be stably produced.

As shown in Comparative Example No. 35, when the Si is higher than the range of the present invention, the workability, including the welds, becomes remarkably degraded and approximately fan-shaped deformed wire cannot be stably produced.

As shown in Comparative Example No. 36, when the (Mn+Cr) is higher than the range of the present invention, the workability, including the welds, becomes remarkably degraded and approximately fan-shaped deformed wire cannot be stably produced.

TABLE 6

| | Properties of deformed wire | | | | | | | | |
|---|---|---|---|---|---|---|---|---|---|
| Test No. | OD (mm) | ID (mm) | Reduction rate (%) | TS (MPa) | EL (%) | No. of deformed wires forming protective layer | Si segregation degree of α/θ interface | No. of shear bands | Angle of shear bands | Work-ability |
| Comp. Ex. | | | | | | | | | | |
| 33 | 5.20 | 2.55 | 85.0 | 1755 | 3.2 | 3 | — | 5 | 43 | Good |
| 34 | 5.20 | 2.55 | 72.3 | 1992 | 1.2 | 3 | — | 25 | 43 | Breakage |
| 35 | 5.20 | 2.55 | 72.3 | 1966 | 1.6 | 3 | — | 7 | 42 | Breakage |
| 36 | 5.20 | 2.55 | 72.3 | 1987 | 1.5 | 3 | 1.83 | 9 | 42 | Breakage |
| 37 | 5.20 | 2.55 | 77.1 | 2018 | 1.7 | 3 | 1.83 | 7 | 37 | Breakage |
| 38 | 5.20 | 2.55 | 77.1 | 1934 | 1.2 | 3 | — | 29 | 39 | Breakage |
| 39 | 5.20 | 2.55 | 77.1 | 1918 | 1.5 | 3 | — | 9 | 8 | Breakage |
| 40 | 5.20 | 2.55 | 77.1 | 1924 | 2.1 | 3 | — | 31 | 6 | Breakage |
| 41 | 5.20 | 2.55 | 77.1 | 2130 | 0.7 | 3 | 1.03 | 8 | 39 | Breakage |

As shown in Comparative Example No. 37, even when the Ceq is in the range, if the total of Al, Ti, Mo, V, Nb, and B is higher than the range, the workability becomes remarkably degraded and approximately fan-shaped deformed wire cannot be stably produced.

As shown by Comparative Examples 33 to 37 above, if the composition is outside the range of the present invention, high strength approximately fan-shaped deformed wire cannot be stably produced.

As shown in Comparative Example No. 38, when the shear band angle in the approximately fan-shaped deformed wire is greater than the range of the present invention, as shown in Comparative Example No. 39, when the shear band angle is lower than the range of the present invention, and as shown in Comparative Example No. 40, when the number of the shear bands in the approximately fan-shaped deformed wire and the shear band angle are both outside the range of the present invention, the wire rod frequently breaks during working and the approximately fan-shaped deformed wire cannot be stably produced.

As shown by Comparative Examples 38 to 40 above, even if the composition is in the range of the present invention, if the number or angle of the shear bands in the microstructure is outside the range of the present invention, high strength approximately fan-shaped deformed wire cannot be stably produced.

As shown in Comparative Example No. 40, when the Si segregation degree of the cementite/ferrite interface is more than the range of the present invention, ageing during drawing progresses, the workability becomes remarkably degraded, and approximately fan-shaped deformed wire cannot be stably produced.

Example 2

A 2t unit weight billet containing 0.82% C-1.0% Si-0.50% Mn-0.0045% Al (Ceq=1.23%) was heated to 1050° C., then rolled to a wire diameter of 4.0 mm and air blast cooled at 7° C./s or so to obtain a unit weight 2t wire rod coil adjusted to a tensile strength of 1300 MPa. Next, the scale was removed, then the wire rod was given a phosphor zinc coating. After this, the wire rod was heated at 900° C. for 1 minute, butt welded, and cooled. The weld was reheated at 850° C. for 1 minute, then cooled at a cooling rate of 10° C./s, then the rod was drawn by a die to 3.0 mm and cold rolled by rollers to a rectangular cross-section wire rod of a thickness of 1.8 mm. Next, to obtain the substantial fan shape, the rod was cold rolled by rollers having approximately fan-shaped calibers to obtain approximately fan-shaped deformed wire of a length of 60 km having an outside diameter b: 5.2 mm, inside diameter a: 2.55 mm, thickness t: 1.325 mm, tensile strength 1820 MPa, and pebbled surface relief depth of an average 1 μm.

INDUSTRIAL APPLICABILITY

The approximately fan-shaped deformed wire of the present invention can be made the desired length by welding and further can provide an extremely high strength, so can solve the problem of the shallower depth of use accompanying an increase in weight of the cable or decline in tension-bearing ability. Further, when used for cables of the current structures, there is also the effect that use at deeper depths becomes possible.

The invention claimed is:

1. Deformed wire for reinforcing submarine optical fiber cable characterized by including, by wt %, C: more than 0.65% to 1.1%, Si: 0.15 to 1.5%, and Mn: 0.20 to 1.5% and further including one or two or more of Cr: 1.2% or less, where (Mn+Cr): 0.2 to 1.5%, Mo: 0.01 to 0.1%, V: 0.01 to 0.1%, Al: 0.002 to 0.1%, Ti: 0.002 to 0.1%, Nb: 0.001 to 0.3%, and B: 0.0005 to 0.1%, where a total of (Mo+V+Al+Ti+Nb+B) is 0.0005 to 0.5%, and a balance of Fe and unavoidable impurities, Ceq=C+1/4Si+1/5Mn+4/13Cr satisfying 0.80%≦Ceq≦1.80%, being a ferrite-pearlite structure or pearlite structure, having a number of shear bands cutting across an L-section center axial line (shear bands having inclination with respect to rolling direction) of 20/mm per unit length of the center axis, having an angle formed by the center axis and shear bands in the range of 10 to 90°, having a tensile strength of 1800 MPa or more, having a sectional area forming an approximately fan shape, a plurality of the approximately fan shapes being combined to form a circular hollow cross-section for accommodating optical fibers, having at its surface a pebbled surface comprised of relief shapes of depths of 0.2 to 5 μm, and having a weld at least at one location in the longitudinal direction.

2. Deformed wire for reinforcing submarine optical fiber cable characterized by including, by wt %, C: more than 0.65% to 1.1%, Si: 0.15 to 1.5%, and Mn: 0.20 to 1.5% and further including one or two or more of Cr: 1.2% or less, where (Mn+Cr): 0.2 to 1.5%, Mo; 0.01 to 0.1%, V: 0.01 to 0.1%, Al: 0.002 to 0.1%, Ti: 0.002 to 0.1%, Nb: 0.001 to 0.3%, and B: 0.0005 to 0.1%, where a total of (Mo+V+Al+Ti+Nb+B) is 0.0005 to 0.5%, and a balance of Fe and unavoidable impurities, Ceq=C+1/4Si+1/5Mn+4/13Cr satisfying 0.80%≦Ceq≦1.80%, being a ferrite-pearlite structure or pearlite structure, by having Si segregated so as to satisfy a Si maximum segregation degree of the cementite/ferrite interface in the range of 30 nm to the ferrite phase side from the cementite and ferrite interface of the pearlite structure (maximum Si concentration/Si content of bulk in range of 30 nm to ferrite phase side from cementite and ferrite interface)≧1.1, having a number of-shear bands cutting across an L-section center axial line (shear bands having inclination with respect to rolling direction) of 20/mm per unit length of the center axis, having an angle formed by the center axis and shear bands in the range of 10 to 90°, having a tensile strength of 1800 MPa or more, having a sectional area forming an approximately fan shape, a plurality of the approximately fan shapes being combined to form a circular hollow cross-section for accommodating optical fibers, having at its surface a pebbled surface comprised of relief shapes of depths of 0.2 to 5 μm, and having a weld at least at one location in the longitudinal direction.

* * * * *